(12) United States Patent
Ryser

(10) Patent No.: US 7,620,795 B1
(45) Date of Patent: Nov. 17, 2009

(54) CONTROLLER FOR A PROCESSOR HAVING INTERNAL MEMORY

(75) Inventor: Peter Ryser, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 574 days.

(21) Appl. No.: 11/035,614

(22) Filed: Jan. 14, 2005

(51) Int. Cl.
*G06F 15/00* (2006.01)

(52) U.S. Cl. ....................................... 712/9
(58) Field of Classification Search ............... 712/9
See application file for complete search history.

(56) References Cited

U.S. PATENT DOCUMENTS 6,079,015 A * 6/2000 Harwood et al. ............. 712/244
6,625,727 B1 * 9/2003 Moyer et al. ................ 713/1

OTHER PUBLICATIONS

Intel Corporation, "Intel 845G/845GL/845GV Chipset", Oct. 2002.*
U.S. Appl. No. 10/683,944, filed Oct. 10, 2003, Young.
U.S. Appl. No. 10/787,353, filed Feb. 26, 2004, Ryser.
U.S. Appl. No. 10/850,123, filed May 20, 2003, Ryser.
Xilinx, Inc.; "Virtex-4 User Guide" version 1.1 [online], Xilinx Inc., 2004, retrieved on Dec. 16, 2004 from the Internet <http://direct.xilinx.com/bvdocs/userguides/ug070.pdf>.
Xilinx, Inc.; "Virtex-4 Packaging and Pinout Specification" publication UG075 (v2.0) [online], Xilinx Inc., 2004, retrieved on Dec. 16, 2004 from the Internet <http://directxilinx.com/bvdocs/userguides/ug075.pdf>.
Xilinx, Inc.; "Virtex-4 Data Sheet: DC and Switching Characteristics" publication DS302 (v1.1) [online], Xilinx Inc., 2004, retrieved on Dec. 16, 2004 from the Internet <http://direct.xilinx.com/bvdocs/publications/ds302.pdf>.
Xilinx, Inc.; "Virtex-4 Family Overview" publication DS112 (v1.2) [online], Xilinx Inc., 2004, retrieved on Dec. 16, 2004 from the Internet <http://direct.xilinx.com/bvdocs/publications/ds112.pdf>.
Xilinx, Inc.; "PowerPC™ 405 Processor Block Reference Guide" publication UG018 (v2.0) [online], Xilinx Inc., 2004, retrieved on Dec. 16, 2004 from the Internet <http://direct.xilinx.com/bvdocs/userguides/ug018.pdf>.
Xilinx, Inc.; "PowerPC 405 Processor Block Reference Guide" publication EDK 6.1 [online], Xilinx Inc., 2003, retrieved on Dec. 16, 2004 from the Internet <http://direct.xilinx.com/bvdocs/userguides/ppc_ref_guide.pdf>.
Kalra, Punit, "UltraController-II: Minimal Footprint Embedded Processing Engine", XAPP 575, v1.1.1, Aug. 5, 2005, pp. 1-22, available from Xilinx, Inc., 2100 Logic Drive, San Jose, CA 95124.
Ryser, Peter, "Debughalt Controller for PowerPC Boot and Reset Operations", XAPP 571, v1.0.1, Jan. 27, 2005, pp. 1-6, available from Xilinx, Inc., 2100 Logic Drive, San Jose, CA 95124.

* cited by examiner

*Primary Examiner*—Eddie P Chan
*Assistant Examiner*—John Lindlof
(74) *Attorney, Agent, or Firm*—W. Eric Webostad; Thomas George

(57) ABSTRACT

Apparatus and method for a microcontroller are described. The microcontroller includes a microprocessor having storage and bussing for accessing the storage. A portion of the bussing is coupled to hardwired operation codes, and a portion of the storage is for storing code. The hardwired operation codes are in part for placing the microprocessor into an exception handling mode. The exception handling mode includes reactivating the storage for execution of the code without having to reload the code therein.

20 Claims, 6 Drawing Sheets

CONTROLLER FOR A PROCESSOR HAVING INTERNAL MEMORY

FIELD OF THE INVENTION

One or more aspects of the invention relate generally to a controller for a processor having internal memory and more particularly, to a controller loaded into internal cache memory of a processor, where the processor is embedded in a host integrated circuit.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAM"), multipliers, digital signal processing blocks ("DSPs"), processors, clock managers, delay lock loops ("DLLs"), and so forth. Notably, as used herein, "include" and "including" mean including without limitation.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block." A controller instantiated in programmably configurable circuitry of an FPGA ("FPGA fabric"), including one or more BRAMs, which communicated with an embedded microprocessor operated at about half the operating frequency of the embedded microprocessor ("processor") due to the operating speed of the BRAM or BRAMs employed. Though control input to a processor may indicate a ratio of these two clock frequencies, providing different clock signals to BRAM and a processor introduces other timing issues. Other limitations of prior controllers employed in an FPGA include inability to use processor internal cache, lack of interrupts, and lack of access to processor internal timers.

Accordingly, it would be desirable and useful to provide a controller capable of operating at the frequency of operation of the processor. Furthermore, it would be desirable and useful to provide a controller capable of overcoming one or more of the other above-mentioned limitations.

SUMMARY OF THE INVENTION

One or more aspects of the invention generally relate to a controller for a processor having internal memory and more particularly, to a controller loaded into internal memory of a processor, where the processor is embedded in a host integrated circuit, such as a programmable logic device or an application specific integrated circuit.

An aspect is a microcontroller including a microprocessor having storage and bussing for accessing the storage. A portion of the bussing is coupled to hardwired operation codes, and a portion of the storage is for storing code. The hardwired operation codes are in part for placing the microprocessor into an exception handling mode. The exception handling mode includes reactivating the storage for execution of the code without having to reload the code therein.

Another aspect of the invention is a method for resetting a microcontroller having code loaded in cache memory of a microprocessor, the microprocessor having first and second input bussing, the method includes: obtaining an exception address; obtaining first hardwired operation code input to a first portion of the first input bussing of the microprocessor responsive to the exception address; determining if the exception address is for a reset or non-reset exception. If the exception address is for the reset exception, loading a reset value responsive to second hardwired operation code input to a second portion of the first input bussing; and moving to a location associated with the reset value loaded to reactivate the cache memory for execution of the code previously loaded therein, where the moving is responsive to a third hardwired operation code input to a first portion of the second input bussing.

BRIEF DESCRIPTION OF THE DRAWINGS

Accompanying drawings show exemplary embodiments in accordance with one or more aspects of the invention; however, the accompanying drawings should not be taken to limit the invention to the embodiments shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items, however, in alternative embodiments the items may be different.

Figure 1:
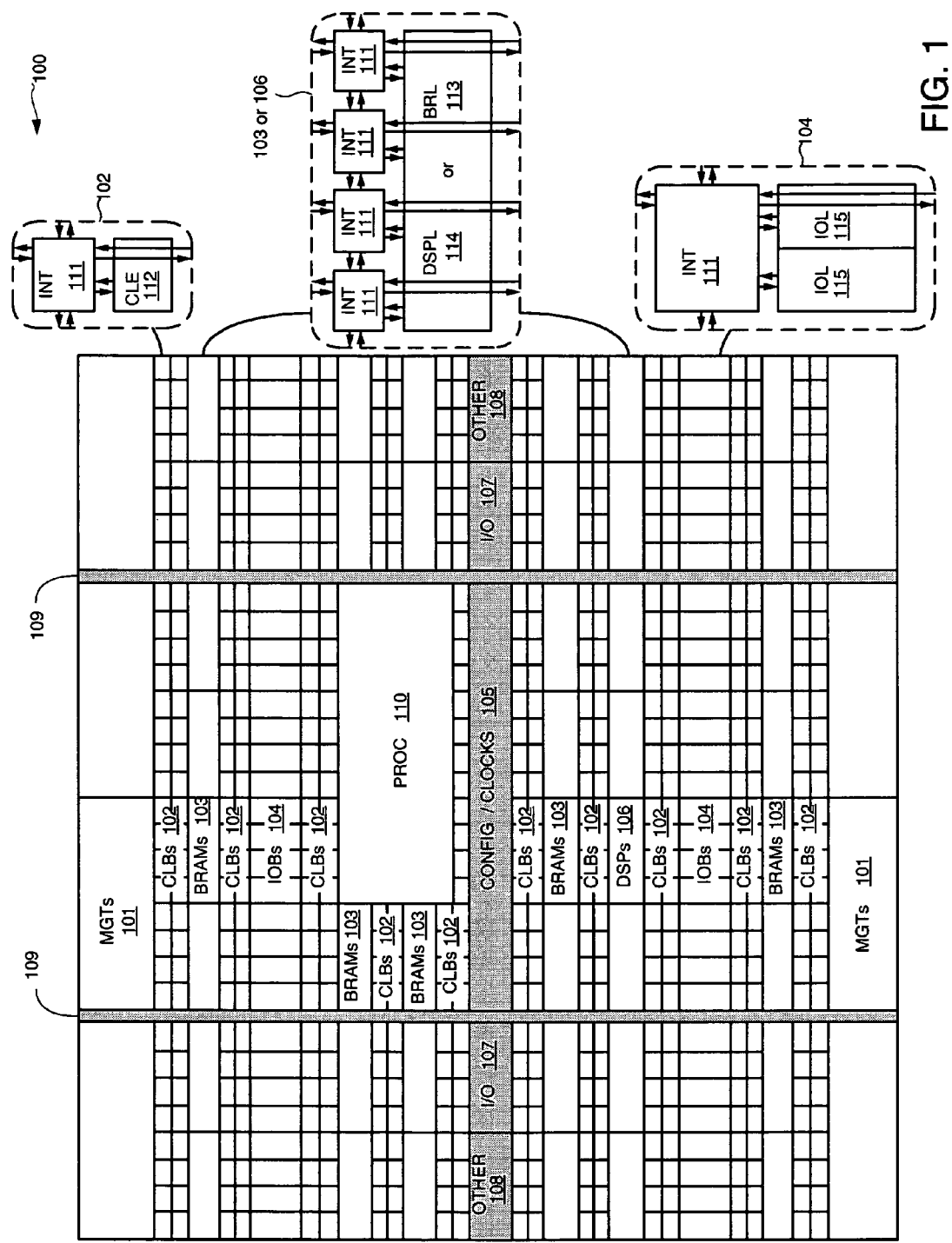
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110. FPGA 100 may be used to implement system 100 of FIG. 1.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. Additional details regarding a columnar architected FPGA may be found in a co-pending patent application, namely, U.S. patent application Ser. No. 10/683,944 entitled, "Columnar Architecture" by Steven P. Young, filed Oct. 10, 2003, which is incorporated by reference herein in its entirety.

FPGA 100 may be a Virtex-4™ FPGA from Xilinx of San Jose, Calif. The Xilinx Virtex-4™ FPGA is described in detail in each of the following publications, each of which is incorporated by reference herein in its entirety: "Virtex-4 User Guide" version 1.1 [online], Xilinx Inc., 2004, [retrieved on 2004 Dec. 16], retrieved from the Internet <http://direct.xilinx.com/bvdocs/userguides/ug070.pdf>; "Virtex-4 Packaging and Pinout Specification" publication UG075 (v2.0) [online], Xilinx Inc., 2004, [retrieved on 2004 Dec. 16], retrieved from the Internet <http://direct.xilinx.com/bvdocs/userguides/ug075.pdf>; "Virtex-4 Data Sheet: DC and Switching Characteristics" publication DS302 (v1.1) [online], Xilinx Inc., 2004, [retrieved on 2004 Dec. 16], retrieved from the Internet <http://direct.xilinx.com/bvdocs/publications/ds302.pdf>; and "Virtex-4 Family Overview" publication DS112 (v1.2) [online], Xilinx Inc., 2004, [retrieved on 2004 Dec. 16], retrieved from the Internet <http://direct.xilinx.com/bvdocs/publications/ds112.pdf>. FPGA 100 may have an embedded processor, which in the Virtex-4 FPGA is an embedded PowerPC™ 405 Core. PowerPC™ 405 Core is described in detail in each of the following publications, each of which is incorporated by reference herein in its entirety: "PowerPC™ 405 Processor Block Reference Guide" publication UG018 (v2.0) [online], Xilinx Inc., 2004, [retrieved on 2004 Dec. 16], retrieved from the Internet <http://direct.xilinx.com/bvdocs/userguides/ug018.pdf>; and "PowerPC 405 Processor Block Reference Guide" publication EDK 6.1 [online], Xilinx Inc., 2003, [retrieved on 2004 Dec. 16], retrieved from the Internet <http://direct.xilinx.com/bvdocs/userguides/ppc_ref_guide.pdf>.

FPGA 100 illustratively represents a columnar architecture, though FPGAs of other architectures, such as ring architectures for example, may be used. Moreover, it should be understood that though the description that follows is premised on a microprocessor embedded in an FPGA, it should be appreciated that a stand-alone processor integrated circuit having internal memory may be used, an application specific integrated circuit having an embedded processor may be used, or an application specific standard product, other than an FPGA, may be used.

As is known, FPGA fabric may be coupled to an embedded processor via a general-purpose input/output interface ("GPIO"). What follows includes a description of a microcontroller embedded in an FPGA that does not need to employ a BRAM external to the microprocessor to implement the microcontroller. This is achieved in part by having boot code provided via a hardwired interface, as described below in additional detail.

Figure 2:
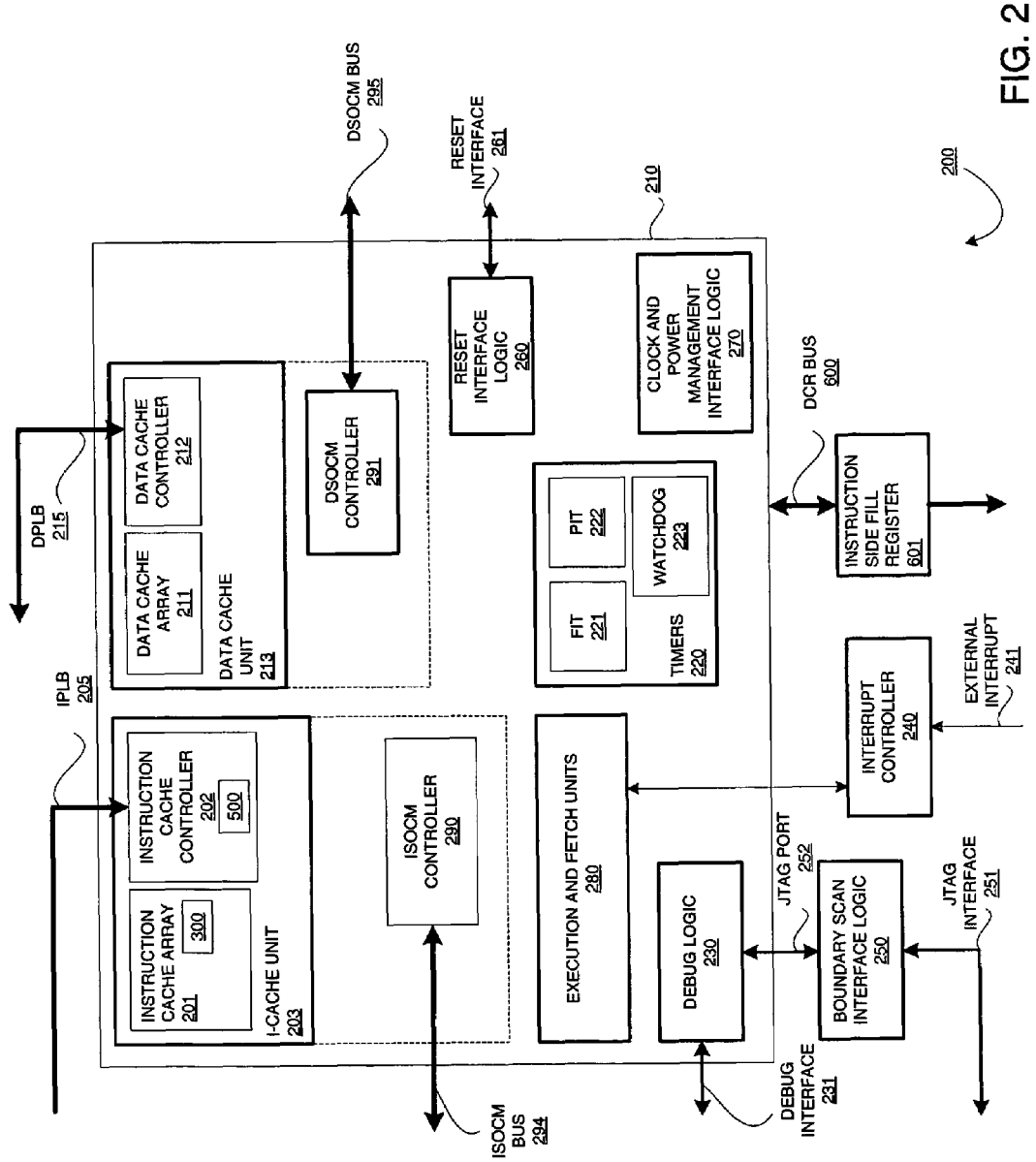
FIG. 2 is a high-level block diagram depicting an exemplary embodiment of a microprocessor core and gasket logic.

FIG. 2 is a high-level block diagram depicting an exemplary embodiment of a microprocessor core and gasket logic 200. Microprocessor core 210 may include an instruction cache unit 203, a data cache unit 213, execution and fetch units 280, data-side on-chip memory ("DSOCM") controller 291, instruction-side on-chip memory ("ISOCM") controller 290, reset interface logic 260, timers 220, debug logic 230, and clock and power management interface logic 270. Conventionally, input clock signaling is provided to clock and power management interface logic 270 of PowerPC 405 Core to drive such core as well as buses and interfaces thereof. For purposes of clarity by way of example and not limitation, microprocessor core 210 is described as a PowerPC 405 Core available from IBM of New York. PowerPC 405 Core is well-known, and thus is not described in unnecessary detail for purposes of clarity. Though multiple clocks may be provided, where such clocks may have different frequencies, it is assumed for purposes of clarity by way of example that all input clock signaling is at the same frequency.

Instruction cache unit 203 may include an instruction cache array 201 and an instruction cache controller 202. Data cache unit 213 may include a data cache array 211 and a data cache controller 212. Timers 220 may include fixed interval timer ("FIT") 221, programmable interval timer ("PIT") 222, and watchdog timer ("WDT") 223. An interrupt controller 240 may be coupled to microprocessor core 210. An external interrupt signal 241 may be provided to interrupt controller 240 for communication of an external input interrupt to execution and fetch units 280. An instruction-side on-chip memory fill register ("ISFILL register") 601 may be coupled to a device control register bus ("DCR bus") 600 of microprocessor core 210.

Though not shown, ISOCM controller 290, as well as DSOCM controller 291, may include a respective internal DCR port for coupling to DCR bus 600, as is known. In this example, ISFILL register 601 external to microprocessor core 210 is coupled to ISOCM 290 of microprocessor core 210 via DCR bus 600. Additionally, ISOCM bus 294 is coupled to ISOCM controller 290, and DSOCM bus 295 is coupled to DSOCM controller 291.

Debug logic 230 may include a debug interface 231 and a JTAG port 252. JTAG port 252 may be coupled to boundary scan interface logic 250. Boundary scan interface logic 250 may be coupled to a JTAG interface 251. For microprocessor core and gasket logic 200 embedded in processor block 110 of FPGA 100 of FIG. 1, code 300 for a microcontroller may be loaded into instruction cache unit 203 as part of a configuration bit stream for initializing FPGA 100. Code 300 may be loaded into microprocessor core 210 via JTAG port 252 for instruction cache unit 203. Thus, a debugger of microprocessor core 210 may be used to load instructions into instruction cache array 201 and to load data into data cache array 211. Data that may be loaded may include constants and initialized variables. Notably, code 300 and data are loaded prior to execution of such code by microprocessor core 210. Notably, JTAG port 252 is coupled to instruction cache unit 203 and to data cache unit 213, as is known, though not shown, for purposes of clarity. Again, it should be appreciated that known details of microprocessor core 210 are not shown for purposes of clarity. Additional details regarding loading code 300 and data during configuration of FPGA 100 may be found in a co-pending patent application entitled "Configuration Logic for Embedded Software" by Peter Ryser, U.S. patent application Ser. No. 10/850,123, filed May 20, 2004, which is incorporated by reference herein in its entirety.

After code 300 for a microcontroller is loaded into instruction cache unit 203, a microcontroller employing microprocessor core 210 may begin to operate as an embedded controller of FPGA 100 of FIG. 1. For microprocessor core 210, upon receiving a reset signal such as via reset interface 261 coupled to reset interface logic 260, instruction cache unit 203 is disabled with respect to operation of microcontroller code 300. After reset, however, microcontroller code 300 remains in instruction cache array 201. Furthermore, for the exemplary embodiment of a PowerPC 405 Core for microprocessor core 210, data valid registers maintain a previous state prior to a reset, though a cache disable bit is set to disable caching after a reset signal is applied. It should be understood that reset logic 260 may be triggered by a signal external to microprocessor core 210. Moreover, reset logic 260 may be internally triggered by microprocessor core 210, such as by a microcontroller under control of code 300.

As described below, code 300 need not be reloaded into instruction cache array 201 after reset, where caching is reactivated in order to use code 300 previously loaded during configuration of FPGA 100 of FIG. 1. Additionally, as described below, information is provided to microprocessor core 210 for exception ("interrupt") handling as well as reactivating caching after a reset. Notably, though these two types of information may be sequentially provided to microprocessor core 210, such provisioning would entail employing additional circuitry such as for a state machine. As shall become appreciated from the following description, both exception handling and reset handling are provided by microprocessor core 210 configured as a microcontroller without using an external state machine for such types of handling.

Figure 3:
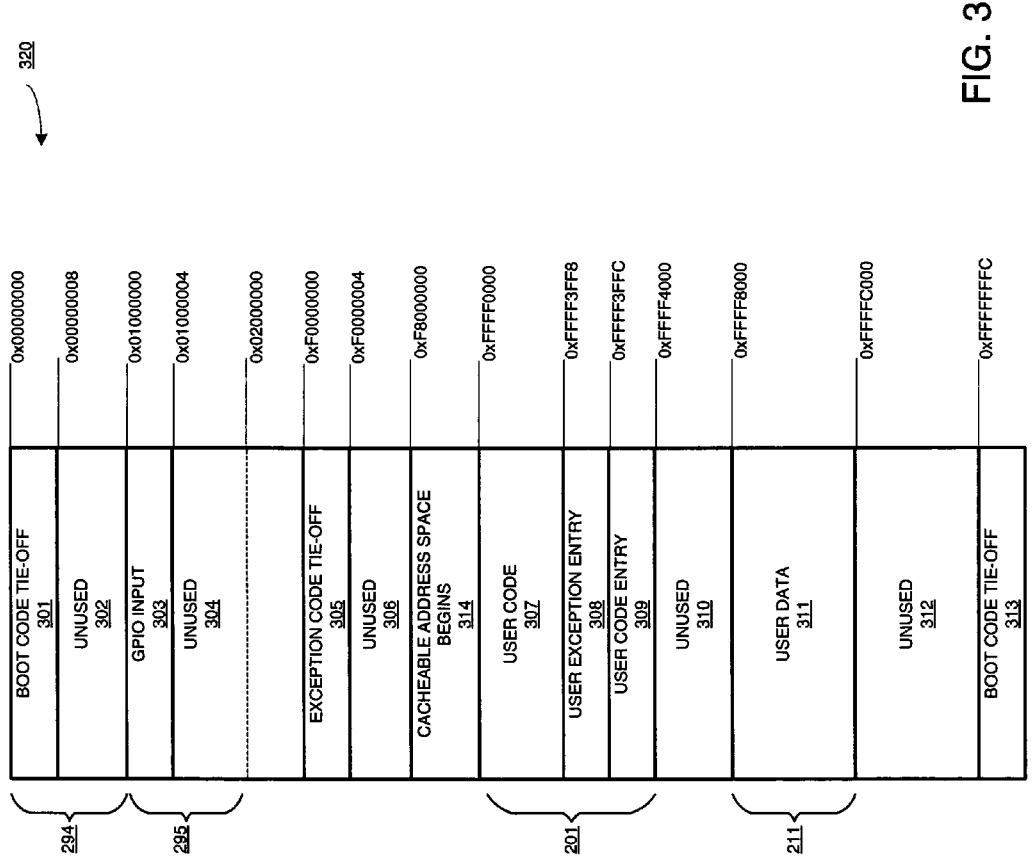
FIG. 3 is a high-level block diagram depicting an exemplary embodiment of an address map.

FIG. 3 is a high-level block diagram depicting an exemplary embodiment of an address map 320. Address map 320 in this example includes: boot-code tie-off address space 301, unused address space 302, general-purpose input/output ("GPIO") input address space 303, unused address space 304, exception code tie-off address space 305, unused address space 306, cacheable address space beginning 314, user code address space 307, user exception entry address space 308, user code entry address space 309, unused address space 310, user data address space 311, unused address space 312, and boot code tie-off address space 313. Address spaces 307 through 309 are associated with instruction cache array 201, and address space 311 is associated with data cache array 211. Address spaces 301 and 302 are associated with ISOCM bus 294. Address space 303 and a portion of address space 304, namely from address 0x01000004 down to address 0x01FFFFFF in this example, are associated with data-side on-chip memory ("DSOCM") read bus 295. With simultaneous reference to FIGS. 1, 2, and 3, address map 320 is further described.

ISOCM bus 294 is coupled to ISOCM controller 290 for communication with microprocessor core 210. Notably, instruction cache controller 202 and ISOCM controller 290 may be functionally combined as indicated by a dashed line extending instruction cache unit 203; however, for purposes of clarity these are shown as separate blocks of microprocessor core 210. Moreover, data cache controller 212 and DSOCM 291 may be functionally combined as indicated by a dashed line extending data cache unit 213; however, for purposes of clarity these are shown as separate blocks of microprocessor core 210.

A read bus portion of ISOCM bus 294 is used for inputting a boot code and tie-offs, as described below in additional detail, to ISOCM controller 290 for configuring microprocessor 210 as a microcontroller. Though some pins forming ISOCM bus 294 are described herein as hardwired, where each pin is either coupled to ground or a referenced voltage for logic zero and one levels, respectively, it should be appreciated that such hardwired addressing may alternatively be selectively multiplexed signal input to ISOCM 294 to expand functionality of ISOCM 294. However, for purposes of clarity, it shall be assumed that inputs to ISOCM 294 are hardwired. Moreover, as shall become more apparent, inputs to other buses described herein may be hardwired or multiplexed inputs, though such inputs are described for purposes of clarity as being hardwired.

Boot code tie-off address space 301 begins at address 0x00000000 in this example. Notably, though specific numerical examples are provided for purposes of clarity by way of example, it should be understood that other addresses and address ranges, including for caches of microprocessor core 210, may be used. Accordingly, for example, a boot code tie-off address space may begin at an address other than address 0x00000000.

ISOCM controller 290 may have three ports which are tied-off, as described below in additional detail the several following paragraphs, to configure ISOCM controller 290.

ISOCM bus 294 has a portion of its pins of a control bus associated with DCR access tied to a known state. Accordingly, such DCR access pins may be tied to provide a known state to avoid unwanted error. For example, ISOCM bus 294 may have a control bus where pins for an instruction-side DCR address, such as TIEISOCMDCRADDR[0:7], are tied to 0xFF.

A portion of the pins of the control bus of ISOCM bus 294 are for instruction side speed ratio control. This ratio is to identify a ratio of operating frequencies of an external memory and microprocessor core 210. In this particular example, though no external BRAM memory need be used, this ratio is set at 1 to 1. For example, ISOCM bus 294 may have a control bus where pins for an instruction side control value, such as ISCNTLVALUE[0:7], are tied to 0x81.

A portion of the pins of a control bus of ISOCM bus 294 are to identify where the ISOCM access address space begins. This is to differentiate ISOCM bus 294 access from instruction-side processor local bus ("IPLB") access. Notably, ISOCM address space may take precedence over IPLB address space, and thus this differentiation may be tied-off. For example, ISOCM bus 294 may have a control bus where pins for instruction side address value, such as ISARCVALUE[0:7], are tied to 0, namely an input address to a control bus of ISOCM bus 294 is mapped to address 0.

A portion of pins of a read bus of ISOCM bus 294 are tied off to a value. An example of such a value is 0x7C1BFBA64BFF3FFE. The port name for the above-identified microprocessor core 210 is BRAMISOCMRDDBUS, namely the BRAM instruction side on-chip memory read data bus port. It is this read port of ISOCM bus 294 which is tied off to the value 0x7C1BFBA64BFF3FFE in this example.

Notably, ISOCM bus 294 is 64 bits wide in this example; however, it should be appreciated that bit widths other than 64 bits may be used. Each of these 32-bit segments for the tied-off value in this example is a separate operation code ("opcode"). In other words, the above-identified tie-off results in an execution of an instruction by microprocessor core 210. These opcodes have mnemonic in assembly code described below in additional detail.

In this embodiment, instruction cache unit 203 is configured for caching starting from the top of a cacheable address range, for example starting from 0xF8000000. Notably, address mapping is for address aliasing, as cacheable address space exceeds the physical address space of instruction cache array 201.

IPLB 205 is for providing instructions to instruction cache controller 202. As mentioned above, ISOCM bus 294 has pins tied to avoid confusion with addresses for IPLB 205. IPLB 205, which in this example is also a 64-bit wide bus, is tied off to a value. For example, a read port PLBC405ICURDDBUS, namely a processor local bus instruction cache unit read data bus for a PowerPC Core 405 port, is tied to a value 0x4BFF3FFA38000001. As with ISOCM bus 294, the first 32 bits of this value is for one opcode and the other 32 bits of this value is for another opcode.

This tie-off value results in instructions for microprocessor core 210. One of these opcodes is for an absolute branch instruction, namely a jump to an exception vector entry address space. The other of these opcodes is for an immediate load of a one into the contents of an instruction control register. It should be appreciated that each bit loaded into an instruction control register for this embodiment controls 128 megabytes of cacheable address space. Notably, multiple 128 megabyte cacheable address spaces may be employed, though the present example is for one such 128 megabyte space for purposes of clarity. Furthermore, in the instant example, there are 16 kilobytes of physical cache memory. Thus, for example, an address falling in the 128 megabyte cacheable address space region is cacheable, namely, it may be cached, for example in instruction cache array 201, though such instruction may not actually be within the 16 kilobyte cache at a particular instant in time.

Additionally, a control bus portion of IPLB 205 may be tied to a counter output. For example, a PLBC405ICURDWDADR port, namely a processor local bus instruction cache unit read/write data address port of PowerPC 405 Core, may be tied to the output of a counter, such as a one-bit counter for example, clocked at the same frequency as IPLB 205 to set the word return address responsive to microprocessor core 210 access of IPLB at boot, reset, or exception handling.

Figure 4:
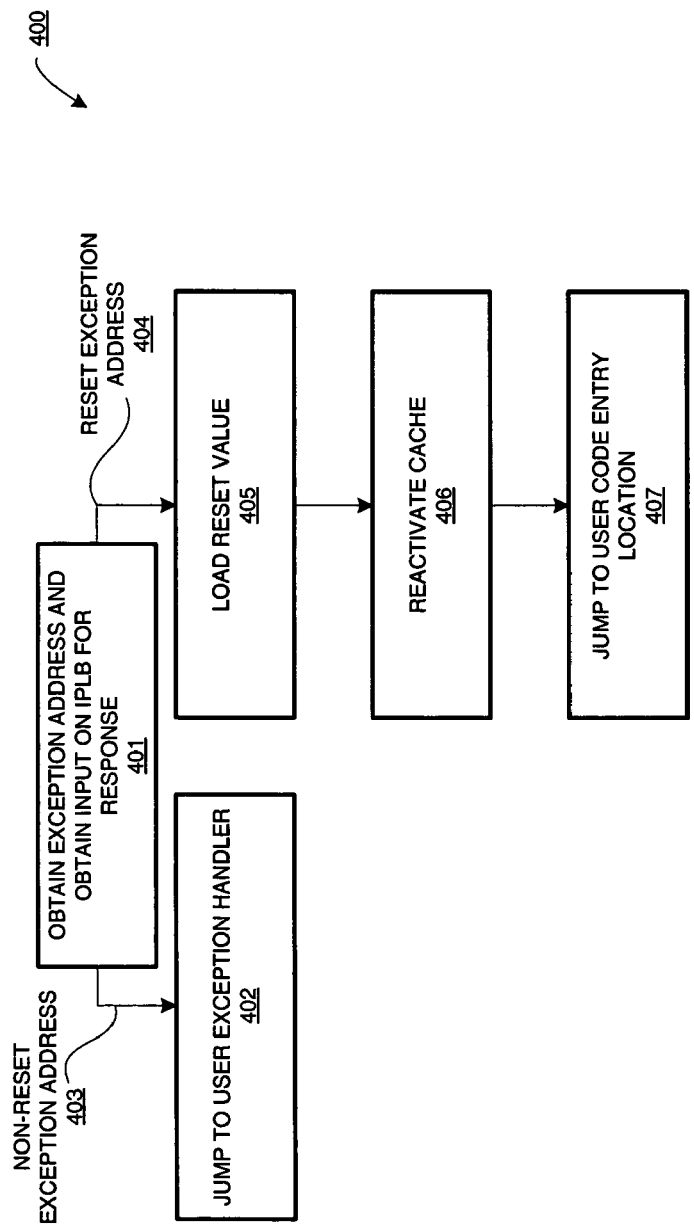
FIG. 4 is a flow diagram depicting an exemplary embodiment of the above-described flow for a exception module.

FIG. 4 is a flow diagram depicting an exemplary embodiment of the above-described flow for an exception module 400. With simultaneous reference to FIGS. 1 through 4, exception module 400 is described.

Exception module 400 includes reactivating instruction cache unit 203 after a reset, such as responsive to a reset signal provided to reset interface logic 260 via reset interface 261, for reusing previously loaded code 300. It should be understood that for the above-described microprocessor core 210, caching is disabled after a reset. The following description describes how microprocessor core 210 may be configured for caching without having to reload code 300, where exception module 400 is implemented with hardwired opcodes.

At 401, an exception address is obtained. This exception address may be a starting location in non-user exception code address space 305, namely exception code tie-off address space 305. An example of an exception address is listed below in row 1/column 1 of Table I. Responsive to the exception address not being for a reset of microprocessor core 210, microprocessor core 210 obtains input on IPLB 205 associated with a user exception address.

At 402, for IPLB 205 coupled to or tied off to an opcode value, such as listed below in row 1/column 2 of Table I, as associated with a non-reset exception address 403, exception module 400 branches or jumps to a user exception entry address. Notably, the example tie-off value listed in row 1/column 2 of Table I is the first 32 bits of a read bus of IPLB 205, which is 64 bits wide. A user exception entry address may be a starting location of user exception entry address space 308. This is a location where a user may store exception handling code for execution. An example of a user exception vector for such a jump is listed below in row 1/column 3 of Table I. Thus, after this jump, user exception handling code may be executed out of instruction cache array 201.

Notably, instructions tied off on an IPLB 205 port repeat over an entire address space, such as that of address map 320, except for the address space where ISOCM bus 294 is mapped. Thus, for example, it should be understood that 0xF0000000 is an exception entry location for exception code address space 305 for all exceptions other than reset, and the reset entry location is 0xFFFFFFFC for boot code tie-off address space 313, from which addressing may wrap back to address 0.

If, however, at 401 the exception address obtained is a reset address, then the other 32 bits tied off as input to read bus of IPLB 205 are obtained. An example of a reset exception address is listed below in row 2/column 1 of Table I, as was described above, and an example of the opcode for such a reset exception address is listed below in row 2/column 2 of Table I. The exception reset address 404 obtained causes an instruction cache control register 500 of instruction cache controller 202 to load a reset value at 405 responsive to opcode input, namely the other 32 bits tied off as input to a read bus of IPLB 205 obtained, associated with such exception reset address 404. Notably, for a PowerPC 405 Core, loading a 1 for a reset value as in this example in an instruction control register of instruction cache controller 202 means setting the address to the topmost address of the address space, such as address 0xF8000000 of address map 320, which in this example is a 128 megabyte address space.

Notably, the above-described exception addresses may be cached in instruction cache array 201, though the non-reset exception entry location, such as 0xF0000000, is outside of a cacheable address range. Microprocessor core 210 is configured to load and execute responsive to tied-off values. However, user exception entry location is within the cacheable address range of instruction cache unit 203, as instruction cache array 201 is loaded as part of a configuration bitstream provides a pointer to an exception handler.

By loading a reset value that resets to the topmost address of the address space, exception module 400 wraps around from top boot code tie-off address space 313 to bottom boot code tie-off address space 301. In this example, for a PowerPC 405 Core implementation the reset vector is hardcoded to address 0xFFFFFFFC. In this example, for address 0 as a next address executed by microcontroller core 210 owing to such wrap around responsive to a reset 1 logic value loaded in instruction cache control register ("iccr") 500, a first 32-bits tied-off input or coupled to a read bus of ISOCM bus 294, namely an opcode for moving to instruction cache control register 500, as associated with address 0 is executed. In this example, ISOCM bus 294 has a 64-bit wide read bus. In this example, the read bus may be BRAMISOCMRDDBUS, namely, a BRAM instruction-side on-chip memory read data bus, which happens to be a read-only bus. By loading instruction cache control register 500 with a logic 1 value, instruction cache unit 203 is activated at 406 for caching from the top of cacheable address of address map 320, which in this example is the top of a 128 megabyte byte address space, namely cacheable address space 0xF8000000 to 0xFFFFFFFF. In other words, the tied-off instruction at 0xFFFFFFFC is not accessed when cache is activated, because it would force instruction cache unit 203 to refilled, which would thereby corrupt code 300 already stored therein. This tied-off instruction is thus only used responsive to a response, when instruction cache unit 203 is disabled.

At 407, another address after address 0 but in boot code tie-off address space 301 is sequentially executed as part of the boot code tie-off sequence. In this example, address 4 is the next address as listed in row 4/column 1 of Table I. The next address being associated with the next 32-bits tied-off input or coupled input to a read bus of ISOCM bus 294, namely an opcode for branching, causes a jump to a user code entry address. An example of an opcode for this branching is listed below in row 4/column 2 of Table I, and an example of an user code entry location address, such as for user code entry address space 309, is listed in row 4/column 3 of Table I. From user code entry address space 309, user code may be executed out of instruction cache array 201.

Table I is a listing of the above-mentioned addresses in hexadecimal, as well as opcodes in hexadecimal and their associated assembly language code for a PowerPC 405 Core.

TABLE I

| Address: | Opcode: | Assembly Listing: |
|---|---|---|
| 0xF0000000 | 0x4BFF3FFA | ba 0xFFFF3FF8 |
| 0xFFFFFFFC | 0x38000001 | li r0, 1 |
| 0x00000000 | 0x7C1BFBA6 | mticcr r0 |
| 0x00000004 | 0x4BFF3FFE | ba 0xFFFF3FFFC |

In this example, rows 1 and 2 of Table I indicate tying off on PLBC405ICURDDBUS, namely processor local bus input to a read data bus of an instruction cache unit of a PowerPC 405 Core, and rows 3 and 4 indicate tying off on BRAMISOCM-RDDBUS, namely external memory, such as BRAM, instruction side on-chip memory read data bus.

Notably, instruction cache unit 203 may be activated prior to data cache unit 213. Alternatively, instruction cache unit 203 may be activated along with data cache unit 213. Furthermore, instructions tied off on an ISOCM port are repeated over the entire ISOCM address space, and only two addresses, namely address 0x00000000 (address 0) and 0x00000004 (address 4) in this example, are used. In this example, the ISOCM address space is 16 megabytes.

Returning to FIG. 2, an example of an exception is an external input interrupt 241, which may be provided to interrupt controller 240. Microprocessor core 210 includes an external interrupt pin coupled to an exception vector prefix register ("EVPR") of a fetch unit of execution and fetch units 280. Interrupt controller 240 may be coupled to the external interrupt pin to provide an address for exception handling. The EVPR includes a first number of bits of the exception address, such as the most significant 16 bits. Adding a 16-bit offset, which is the entry location of an exception, to the EVPR contents provides an address of an exception. However, to avoid having a relatively large exception address space, approximately a 4 to 8 kilobyte exception table in this example, within instruction cache array 201 and to avoid limiting exception addresses to be within a limited range, approximately a 64 kilobyte (e.g., 2^16) address range in this example, a single address is a defined entry point in instruction cache for all exceptions, both external and internal, other than reset. For example, the single address may be 0xF0000000. Accordingly, for this example, the EVPR is set to 0xF0000000. For an external interrupt, which occurs at the EVPR prefix plus an offset of 0x0500, on the address bus of IPLB 205 will appear the address 0xF0000500.

However, all EVPR prefixed addresses are aliased to the single exception handling address for non-reset exceptions. For a microcontroller, there are fewer circumstances in which an exception is conventionally invoked. Accordingly, exception handler code may be limited to a subset of all possible exceptions of microprocessor core 210. For example, exceptions may be limited to certain interrupts. Such exception handling code may be for an externally provided interrupt, other than reset, such as via an external interrupt input pin to microprocessor core 210, or for internally provided interrupts such as from FIT 221, PIT 222 or WDT 223, or any combination thereof.

Notably, this example address of 0xF0000000 is not within cacheable space of address map 320, and thus does not consume cacheable address space. For this address, microprocessor core 210 branches into cache at a defined location that is aligned to the 64 kilobyte boundary. Notably, 0xF0000000 is not inside a cacheable address range and is tied off as a first instruction on IPLB 205. Returning to Table I, for an address 0xF0000000, opcode 0x4BFF3FFA is obtained from IPLB 205 which causes a branch to address 0xFFFF3FF8. In other words, the non-reset exception address when asserted causes microprocessor core 210 to obtain a hardwired opcode that instructs microprocessor core 210 to jump to a user exception entry address space 308 within instruction cache array 201. User code may specify another jump, such as via linker script, to a location of user exception handling code. Such user exception handling code may be located within user accessible virtual cacheable address space. Notably, a user exception entry location is only accessed responsive to a non-reset exception and not a reset exception.

In order to configure microprocessor core 210 during configuration of an FPGA 100, boot code, other than that which is hardwired, is employed. This boot code is referred herein as "soft boot code" to distinguish it from hardwired boot code. A portion of such soft boot code is described with reference to a product called UltraController from Xilinx of San Jose, Calif., and thus is not described in detail herein. Changes or additions to such known soft boot code are described below.

Additions to the known soft boot code are listed below as pseudo code using Embedded Linker Format ("ELF") file extensions, namely .text, .boot, .data, and .trap. The added soft boot code for the above example includes:

| .text | enable data cache |
| | set EVPR=0xF0000000 |
| and | |
| .trap | branch to exception handler. |

Notably, EVPR need not be set in soft boot code, but rather may be set in source code, such as C source code, responsive to initialization of exceptions. This will reduce the size of soft boot code. Setting EVPR may be avoided if exceptions associated therewith are not employed. In this example, the instruction trap is mapped to user exception entry location 308 of FIG. 3. Notably, the trap vector may be set in an exception vectors code listing to reduce the size of soft boot code. The soft boot code file may be referred to as crt0.S. The file crt0.S is used to active data cache, as well as instruction cache, after a reset. Similar to instruction cache, data cache is disabled after a reset. Thus, like instruction cache, data cache may be reactivated by crt0.S, where this file includes the following code:

In r0, 1
mtdccr r0 where register 0 associated with a data cache unit is loaded with a logic 1 value, and where the pointer is then moved to data cache control register 0. Though data and instruction caches may be activated at the same time, it should be understood that for a PowerPC 405 Core two separate sets of instructions are provided for activating instruction cache and data cache. The instructions for instruction cache activation are tied off as previously described, and the instructions for activating data cache are part of crt0.S. The crt0.S file or code listing is loaded into instruction cache unit 203 during initialization of microprocessor core 210, and such soft boot code may be include in user code. Thus, after a reset, instruction cache unit 203 and data cache unit 213 are sequentially reactivated, where previously loaded soft boot code in instruction cache unit 203 is accessed.

Linker script defines memory address space regions. Memory regions to be defined include instruction cache memory user code address space, user exception entry address space, and user code entry address space, as well as data cache memory address space. These memory initial locations in cache memory are defined, as well as size allocated to each. In addition to defining memory address space regions, mapping to section names may be included in a linker script. Using ELF file extensions, pseudo code for a linker script for the above example may include:

| Memory | | |
| Instruction Cache: | 0xFFFF0000 size 16 kilobytes-8 bytes |
| User Exception Entry: | 0xFFFF3FF8 size 4 bytes |
| User Code Entry: | 0xFFFF3FFC size 4 bytes |
| Data Cache: | 0xFFFF8000 size 16 kilobytes |
| and | | |
| Section | | |
| *.text | > | instruction cache |
| *.trap | > | user exception entry |
| *.boot | > | user code entry |
| *.data | > | data cache. |

Data-side on-chip memory ("DSOCM") read bus 295 is coupled to data cache controller 212 of data cache unit 213. Additionally, a data-side processor local bus ("DPLB") 215 may be coupled to data cache controller 212 of microprocessor core 210.

Again, though pins forming DSOCM bus 295 are described herein as hardwired, where some pins are coupled to either a ground or a reference voltage for logic zero and one levels, respectively, it should be appreciated that such hardwired addressing may alternatively be provided via a selectively multiplexed signal input to a port of data cache controller 212 associated with DSOCM bus 295 to expand functionality of DSOCM bus 295. However, for purposes of clarity, it shall be assumed that inputs to DSOCM bus 295 are hardwired.

DSOCM bus 295 has a portion of its pins of a control bus associated with a DSOCM address tied to a known address. For example, DSOCM bus 295 may have a control bus where pins for a data-side DCR address, such as TIEDSOCMDCRADDR[0:7], are tied to address 0xFE. A portion of the pins of the control bus of DSOCM bus 295 are for data-side speed ratio control. This ratio is to identify a ratio of operating frequencies of an external memory and microprocessor core 210. In this particular example, though no external BRAM memory need be used, this ratio is set at 1 to 1. For example, DSOCM bus 295 may have a control bus where pins for a data-side control value, such as DSCNTLVALUE[0:7], are tied to 0x81. A portion of the pins of the control bus of DSOCM bus 295 are to identify where the DSOCM access address space begins. In this implementation, data cache controller 212 of data cache unit 213 is used for a general-purpose input ("GPI") to provide a portion of a general-purpose input/out ("GPIO") interface. For example, DSOCM bus 295 may have a control bus where pins for a data-side address value, such as DSARCVALUE[0:7], are tied to 0x01, namely an input address to a control bus of DSOCM bus 295 is mapped to address 0x01000000 for the above example.

In addition to the pins of a control bus of DSOCM bus 295 being tied off, pins for a DSOCM bus 295 read port may be used for general-purpose input ("GPI") of data. For implementation in an FPGA, these read port pins may be coupled to FPGA fabric for data input to microprocessor core 210. For this example, a read bus of DSOCM bus 295 is a 32-bit wide bus known as BRAMDSOCMRDDBUS port, namely a data-side on-chip memory read data bus for a BRAM port for a PowerPC 405 Core. Thus, data cache controller 212 is employed for GPI.

General-purpose output ("GPO") of a GPIO interface is provided using an instruction-side fill register, namely, instruction-side on-chip memory fill register ("ISFILL register") 601 of FIG. 2. ISFILL register 601 may be part of embedded gasket logic of microprocessor core 200 embedded in FPGA 100 of FIG. 1. ISFILL register 601 may be coupled to microprocessor core 210 via a DCR bus 600 of a PowerPC 405 Core, for example. In an alternate embodiment, a write bus of DSOCM bus 295 may be used for GPO. For example, in an alternate embodiment, a BRAMDSOCM-WRDBUS, namely a BRAM data-side on-chip memory write data bus of a PowerPC 405 Core, may be used for GPO.

For example, a write port associated with ISFILL register 601 such as a 32-bit wide bus associated with ISOCMBRAM-WRDBUS port of a PowerPC Core 405 , namely, an instruction-side on-chip memory write data bus for a BRAM port, may be used for GPO. DCR bus 600 may be coupled to a microprocessor core 210 internal DCR port (not shown) of ISOCM controller 290, as is known. ISOCM controller 290 may be used to control ISFILL register 601 for providing information to ISFILL register 600 via DCR bus 600 to provide GPO.

Notably, data-side caching for data and stack storage may be used as is known. Initialization of data-side cache unit 213, like instruction-side cache unit 203, is done during initialization of microprocessor core 210, and thus configuration of FPGA 100. Reactivation of data-side cache unit 213 post reset is done with soft boot code.

Figure 5:
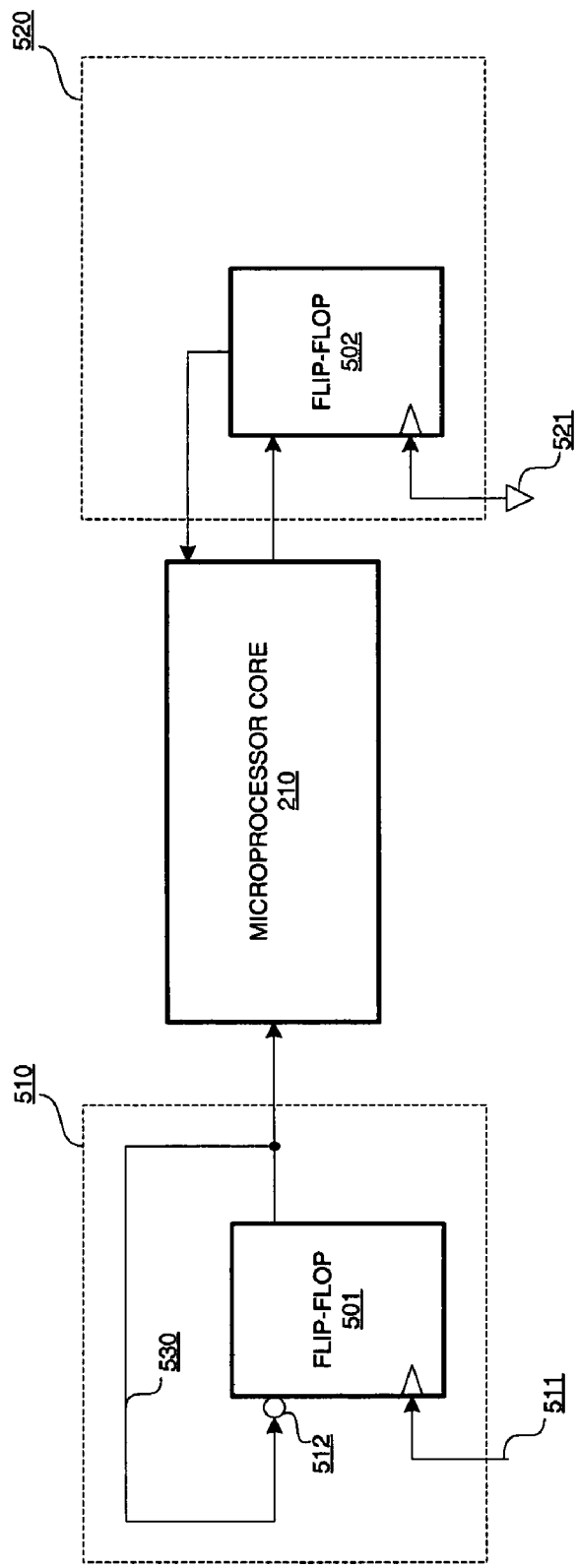
FIG. 5 is a block/schematic diagram depicting an exemplary embodiment of a microprocessor core coupled to write data address logic and debug fault logic.

FIG. 5 is a block/schematic diagram depicting an exemplary embodiment of microprocessor core 210 coupled to write data address logic 510 and debug fault logic 520. Write data address logic 510 is for a PowerPC 405 Core. Write data address logic 510 includes an input to a flip-flop 501 which is clocked responsive to clock signal 511. Output of flip-flop 501 is provided to a write data address port of microprocessor core 210 and is fed back to an input of inverter 512. Input to flip-flop 501 is inverted by inverter 512. Inverter 512 may be implemented as dedicated gasket logic or may be implemented with configurable logic. Output 530 of flip-flop 501 may be provided as input to inverter 512 and as input to microprocessor core 210. Flip-flop 501 is thus configured to toggle responsive to clock signal 511. For a PowerPC 405 Core implementation, microprocessor core 210 issues a request to a PLB, such as IPLB 205, for a number of words to be received. Though for a hardwired input on IPLB 205 the same words will be received each time, microprocessor core 210 still needs to be cycled for receipt of each word as it tracks the number of words requested and received. Notably, flip-flop 501 may be part of gasket logic and operated at the operational speed of microprocessor core 210. Flip-flop 501 was previously described herein as a one-bit counter.

Debug halt logic 520 includes flip-flop 502. Debug halt logic 520 is to prevent microprocessor core 210 from starting prior to loading code 300. A clock port of flip-flop 502 may be coupled to ground 521. Data input to flip-flop 502 is provide from microprocessor core 210. This output from microprocessor core 210 is a debug halt signal output. Flip-flop 502 may be a set/reset ("S/R") flip-flop. An S/R output of flip-flop 502 is provided to a debug halt input port of microprocessor core 210 for asserting or deasserting a debug halt. Additional details regarding debug halt logic 520 may be found in a co-pending patent application entitled "Method and Apparatus for Controlling a Processor in a Data Processing System," by Peter Ryser, U.S. patent application Ser. No. 10/787,353, filed Feb. 26, 2004, which is incorporated by reference herein in its entirety.

Figure 6:
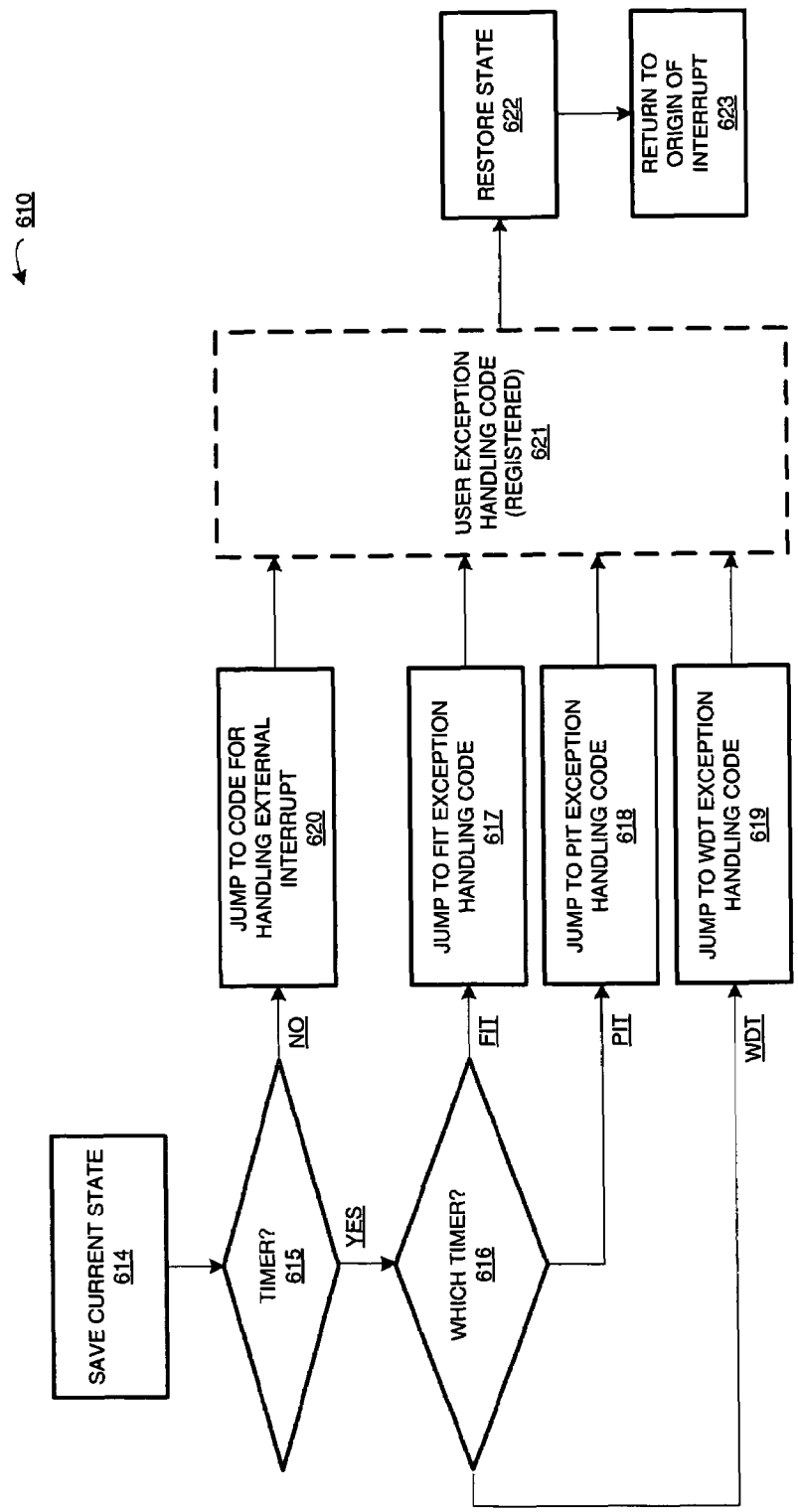
FIG. 6 is a flow diagram depicting an exemplary embodiment of an exception handler.

FIG. 6 is a flow diagram depicting an exemplary embodiment of an exception handler 610. Notably, exception handler 610 is dependent at least in part upon user exception handling code 621, which will vary from application to application, and as such is indicated herein as a dashed box. Once an exception vector is obtained, such as 0xF0000000, a jump to a user exception entry location, such as 0xFFFF3FF8, is made. This was described above with respect to block 401 of FIG. 4. Assuming the exception vector obtained is for a non-reset exception, a jump is made to an exception handler to execute exception handler code, as described with reference to block 402 of FIG. 4.

With simultaneous reference to FIGS. 2 and 6, exception handler 610 is further described. Exception handler 610 at 614 saves the current state of microprocessor core 210. For purposes of clarity, it shall be assumed that the only exceptions are a microprocessor core internal/external reset, external interrupt, and internal interrupt from a timer. As indicated in FIG. 4, only the latter two categories apply to exception handler 610.

At 615, it is determined whether an interrupt was caused by a timer. If the interrupt was not caused by a timer, then such interrupt is an external interrupt. An external interrupt was described with reference to external interrupt 241 of FIG. 2.

For the interrupt not being caused by a timer, a jump to code for handling an external interrupt is made at 620. This jump will be to user exception handling code 621 or, more particularly, to use a portion of such handling code for handling external interrupts. Notably, in order to know where to make such a jump, user exception handling code for external interrupts may be a registered address. After the exception is handled in accordance with user exception handling code, state of microprocessor core 210 is restored at 622. After restoring state, microprocessor core 210 may do an interrupt return at 623, namely, return to the location that caused the invocation of exception handler 610.

If, however, at 615 the interrupt was caused by a timer, then at 616 it may be determined which timer caused the interrupt, such as either a FIT, PIT, or watchdog ("WDT") timer. For a FIT interrupt, a jump to FIT exception handling code is made at 617. For a PIT interrupt, a jump to PIT exception handling code is made at 618. For a WDT interrupt, a jump to WDT exception handling code is made at 619. From jumps 617, 618, or 619, user exception handling code, having registered addresses for such respective FIT, PIT, and WDT exception handling code portions, is executed at 621. Notably, one or more of these exceptions may be handled by the same user exception handling code. After execution of user exception handling code at 621, state of microprocessor core may be restored at 622. After restoring state, microprocessor core 210 may do an interrupt return at 623, namely, return to the location that caused the invocation of exception handler 610.

Notably, though as described above read buses have pins tied to particular logic levels, such pins may be tied to the output of multiplexers for multiplexed input. Thus, a selection between operating microprocessor core 210 either as a general purpose processor or as a microcontroller may be selected by selecting output of such multiplexers.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A microcontroller comprising:
 a microprocessor having internal storage units and bussing for accessing the internal storage units;
 the internal storage units including an instruction cache unit and a data cache unit, the instruction cache unit in part for storing code loaded during configuration of the microprocessor, the code for operating the microprocessor as a microcontroller;

a first portion of the bussing having hardwired input for configuration of an instruction-side of the microprocessor, the first portion having first tie-offs for providing the hardwired input thereto;

a second portion of the bussing having hardwired input for configuration of a data-side of the microprocessor, the second portion having second tie-offs for providing the hardwired input thereto; and a third portion of the bussing hardwired for providing operation codes, the third portion having third tie-offs for providing the hardwired input thereto, the operation codes at least in part for reactivating the instruction cache after a reset of the microprocessor without having to reload the code stored therein;

the first tie-offs, the second tie-offs, and the third tie-offs having respective portions connected either to a reference voltage bus for inputting logic highs or a ground bus for inputting logic lows;

the first tie-offs being for the instruction cache unit for setting an instruction-side speed ratio control between the microprocessor and a first external memory, for identifying a beginning addressable location for the instruction cache unit, and for locating an instruction-side memory read data bus port of the microprocessor;

the second tie-offs being for the data cache unit for setting a data-side speed ratio control between the microprocessor and a second external memory, for identifying a beginning addressable location for the data cache unit, and for locating a data-side memory read data bus port of the microprocessor.

2. The microcontroller, according to claim 1, wherein the first portion of the bussing comprises instruction-side control input bussing for a instruction-side memory controller internal to the microprocessor, and wherein the second portion of the bussing comprises data-side control input bussing for a data-side memory controller internal to the microprocessor.

3. The microcontroller, according to claim 2, wherein the third portion of the bussing comprises instruction-side memory read bussing and instruction-side processor local read bussing.

4. The microcontroller, according to claim 3, wherein the instruction-side memory read bussing is hardwired to operation codes providing a move instruction and a first branch instruction, the move instruction being for moving to an instruction cache control register, the first branch instruction being for branching to a user code entry address in the instruction cache.

5. The microcontroller, according to claim 4, wherein the instruction-side processor local read bussing is hardwired to operation codes providing a load instruction and a second branch instruction, the load instruction being for loading a value into the instruction cache control register, the second branch instruction being for branching to a user exception entry address in the instruction cache.

6. The microcontroller, according to claim 5, wherein the instruction-side control input bussing is hardwired to set instruction-side data rate and to identify where instruction-side memory access address space begins, and wherein the data-side control input bussing is hardwired to set data-side data rate and to identify where data-side memory access address space begins.

7. The microcontroller, according to claim 6, wherein the data cache unit is reactivated after the reset of the microprocessor responsive to a control file, the control file being loaded into the instruction cache unit as part of user input code.

8. The microcontroller, according to claim 5, wherein the operation codes in combination provide for exception handling in combination with an exception handler, the exception handling including handling of an external interrupt input.

9. The microcontroller, according to claim 8, wherein the exception handling further includes handling of at least one timer interrupt.

10. The microcontroller, according to claim 9, wherein at least one timer interrupt originates from one of a fixed interval timer of the microprocessor, a programmable interval timer of the microprocessor, and a watchdog timer of the microprocessor.

11. The microcontroller, according to claim 2, wherein a fourth portion of the bussing comprises data-side read data bus coupled to the data-side memory controller, the data-side read data bus configured to provide a general-purpose input bus.

12. The microcontroller, according to claim 11, wherein a fifth portion of the bussing comprises a data-side write bus coupled to the data-side memory controller, the data-side write data bus configured to provide a general purpose output bus.

13. The microcontroller, according to claim 11, further comprising an instruction side memory fill register coupled externally to the microprocessor, the instruction side memory fill register configured to provide a general purpose output interface.

14. The microcontroller, according to claim 11, wherein a read bus of the data-side cache memory bus is coupled to a hardwired operation code to set an address for the other portion of the storage for data storage, the read bus of the data-side cache memory bus providing a general-purpose input port.

15. A method for resetting a microcontroller having code loaded in cache memory of a microprocessor, the microprocessor having first and second input bussing, the method comprising:

obtaining an exception address;

obtaining first hardwired operation code input to a first portion of the first input bussing of the microprocessor responsive to the exception address, the first hardwired operation code input to the first portion of the first input bussing being provided as first tie-offs;

determining if the exception address is for a reset or non-reset exception;

responsive to the exception address being for the reset exception, loading a reset value responsive to second hardwired operation code input to a second portion of the first input bussing, the second hardwired operation code input to the second portion of the first input bussing being provided as second tie-offs;

moving to a location associated with the reset value loaded to reactivate the cache memory for execution of the code previously loaded therein, the moving responsive to a third hardwired operation code input to a first portion of the second input bussing, the third hardwired operation code input to the first portion of the second input bussing being provided as third tie-offs;

the first tie-offs, the second tie-offs, and the third tie-offs having respective portions connected to either a reference voltage bus for inputting logic highs or a ground bus for inputting logic lows;

setting an instruction-side speed ratio control between the microprocessor and a first external memory using the first tie-offs;

identifying a beginning addressable location for the instruction cache unit using the first tie-offs;

locating an instruction-side memory read data bus port of the microprocessor using the first tie-offs;

setting a data-side speed ratio control between the microprocessor and a second external memory using the second tie-offs;

identifying a beginning addressable location for the data cache unit using the second tie-offs; and locating a data-side memory read data bus port of the microprocessor using the second tie-offs.

16. The method, according to claim 15, further comprising:

responsive to the exception address being for the non-reset operation, branching responsive to a user exception handling vector; and executing user exception handling code responsive to the branch.

17. The method, according to claim 16, wherein the user exception handling code comprises external interrupt input handling for an external interrupt provided to the microprocessor.

18. The method, according to claim 16, wherein the user exception handling code comprises internal timer interrupt handling for an internal interrupt provided from a timer internal to the microprocessor.

19. The method, according to claim 15, further comprising:

branching to a user code entry address space for the execution of the code, the branching responsive to a fourth hardwired operation code input to a second portion of the second input bussing, the fourth hardwired operation code input to the second portion of the second input bussing being provided as fourth tie-offs;

the fourth tie-offs having respective portions connected to either the reference voltage bus for inputting the logic high or the ground bus for inputting the logic low.

20. A microcontroller comprising:

a microprocessor having storage and bussing for accessing the storage, a portion of the bussing coupled to hardwired operation codes, a portion of the storage for storing code, the hardwired operation codes being provided with tie-offs, the hardwired operation codes for placing the microprocessor into an exception handling mode, the exception handling mode including reactivating the storage for execution of the code without having to reload the code therein;

the tie-offs having portions connected to either a reference voltage bus for inputting logic highs of the hardwired operation codes or to a ground bus for inputting logic lows of the hardwired operation codes;

the tie-offs being for setting an instruction-side speed ratio control between the microprocessor and a first external memory, for identifying a beginning addressable location for an instruction cache unit, and for locating an instruction-side memory read data bus port of the microprocessor;

the tie-offs further being for setting a data-side speed ratio control between the microprocessor and a second external memory, for identifying a beginning addressable location for a data cache unit, and for locating a data-side memory read data bus port of the microprocessor.

* * * * *

UNITED STATES PATENT AND TRADEMARK OFFICE
CERTIFICATE OF CORRECTION

PATENT NO. : 7,620,795 B1  Page 1 of 1
APPLICATION NO. : 11/035614
DATED : November 17, 2009
INVENTOR(S) : Peter Ryser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Twenty-sixth Day of October, 2010

David J. Kappos
*Director of the United States Patent and Trademark Office*